United States Patent
Kirby et al.

(10) Patent No.: US 6,993,322 B1
(45) Date of Patent: Jan. 31, 2006

(54) MEANS AND METHOD FOR PREVENTING UNAUTHORIZED USE OF A MOBILE PHONE

(76) Inventors: Philip Kirby, 10 Old Popplewell Lane, Scholes, Cleakheaton West Yorkshire (GB); Wendy Kirby, 10 Old Popplewell Lane, Scholes, Cleakheaton West Yorshire (GB)

( * ) Notice: Subject to any disclaimer, the term of this patent is extended or adjusted under 35 U.S.C. 154(b) by 401 days.

(21) Appl. No.: 10/613,942

(22) Filed: Jul. 7, 2003

(51) Int. Cl.
*H04M 1/66* (2006.01)
*H04B 1/38* (2006.01)

(52) U.S. Cl. .................. 455/410; 455/90.3; 455/575.1; 455/345; 379/434; 379/445

(58) Field of Classification Search ............ 455/550.1, 455/575.8, 90.3, 410, 411, 345, 351; 379/433.01, 379/433.11, 434, 441, 445
See application file for complete search history.

(56) References Cited

U.S. PATENT DOCUMENTS

| | | | |
|---|---|---|---|
| 2,469,806 A | 5/1949 | Zion | |
| 3,866,000 A | 2/1975 | Gillis | |
| 4,153,823 A * | 5/1979 | Hanson | 379/445 |
| 4,396,810 A | 8/1983 | Cover | |
| 4,404,435 A * | 9/1983 | Bonacci et al. | 379/445 |
| 4,825,457 A | 4/1989 | Lebowitz | |
| 5,197,092 A | 3/1993 | Bamburak | |
| 5,241,583 A * | 8/1993 | Martensson | 455/565 |
| 5,568,537 A | 10/1996 | Shechet | |
| 5,699,425 A | 12/1997 | Chambers | |
| 6,314,283 B1 * | 11/2001 | Fielden | 455/411 |
| 6,546,239 B1 * | 4/2003 | Pazdersky et al. | 455/410 |
| 6,571,086 B1 * | 5/2003 | Uusimaki | 455/550.1 |
| 6,892,081 B1 * | 5/2005 | Elomaa | 455/575.1 |

* cited by examiner

*Primary Examiner*—Quochien B. Vuong
(74) *Attorney, Agent, or Firm*—Donald R. Schoonover

(57) ABSTRACT

A locking system and method automatically lock a mobile phone in a manner that significantly reduces or eliminates unauthorized use of a mobile phone. The system includes a key lock which must have a key connected to the lock in order to move the lock from a locked condition to an unlocked condition and a power source switch that automatically de-activates the mobile phone whenever a power source of the phone is removed from the phone. The key lock must be moved into an unlocked condition in order to manually activate the phone after it has been de-activated, and the key must also be connected to the lock in order to manually de-activate the phone after the phone has been activated.

2 Claims, 1 Drawing Sheet

MEANS AND METHOD FOR PREVENTING UNAUTHORIZED USE OF A MOBILE PHONE

BACKGROUND OF THE INVENTION

1. Field of the Invention

The present invention relates to the general art of telephonic communications, and to the particular field of locking devices.

2. Discussion of the Related Art

More and more people are relying on mobile phones. In some cases, a mobile phone is a person's principal means of communication. In fact, many people have totally replaced landline communications with mobile phone communications. As mobile phones become more versatile, they become even more useful and ubiquitous.

While extremely versatile and convenient, mobile phones, by their very nature, are susceptible to being lost or stolen. As anyone who owns a mobile phone knows, calls placed on that phone can be very expensive. A lost or stolen mobile phone can be used in an unauthorized manner to run up a very large phone bill for the owner of the lost or stolen phone.

For this reason, it would be desirable to have some way of locking a mobile phone to prevent unauthorized use. However, the system used to lock a mobile phone must not be difficult or cumbersome to use. For example, if a special combination of called telephone numbers must be used to activate a mobile phone, the system is cumbersome and inconvenient. A youngster may forget the combination. Since more and more youngsters are using mobile phones, this can be a significant drawback.

Therefore, there is a need for a means and a method for preventing unauthorized use of a mobile phone.

Still further, there is a need for a means and a method for preventing unauthorized use of a mobile phone which is easy and convenient to use.

To be most convenient, any lock used on a mobile phone should default to the locked configuration. That is, unless specifically unlocked the mobile phone should always be locked. With such a default setting, the user of the phone does not have to remember to lock the phone. However, this objective cannot be achieved by most presently-available mobile phones. If a special combination is required, the locked situation is generally not a default condition, and must be specifically and intentionally set. This creates a problem, especially for youngsters, which arises because the user must remember to lock the phone or the lock is useless.

Therefore, there is a need for a means and a method for preventing unauthorized use of a mobile phone which is easy and convenient to use and which uses a locked condition as a default condition.

Still further, since the profit margin on many mobile phones is very narrow, any system added to a mobile phone must be very cost effective and cost efficient. This objective applies to new phones as well as existing phones that are retrofit.

Therefore, there is a need for a means and a method for preventing unauthorized use of a mobile phone which is cost effective and cost efficient to implement both new phones and existing phones.

PRINCIPAL OBJECTS OF THE INVENTION

It is a main object of the present invention to provide a means and a method for preventing unauthorized use of a mobile phone.

It is another object of the present invention to provide a means and a method for preventing unauthorized use of a mobile phone which is easy and convenient to use.

It is another object of the present invention to provide a means and a method for preventing unauthorized use of a mobile phone which is easy and convenient to use and which uses a locked condition as a default condition.

It is another object of the present invention to provide a means and a method for preventing unauthorized use of a mobile phone which is cost effective and cost efficient to implement in both new phones and existing phones.

SUMMARY OF THE INVENTION

These, and other, objects are achieved by a locking system and method which includes a key lock system that controls an on/off switch of a mobile phone so that the key must be connected to the lock in order to move the on/off switch from an on condition to an off condition or to move the on/off switch from the off condition to the on condition. The system and method embodying the present invention also has a switch connecting the power source to a housing for the mobile phone which automatically moves the on/off switch into the off condition any time the power source is removed from the housing, regardless of whether or not the key is connected to the lock.

A mobile phone embodying the present invention is locked either in an on condition or in an off condition whenever the key is not connected to the lock. However, the mobile phone will automatically move into the off condition when the power source is removed from the housing and will be locked in that off condition until the key is connected to the lock. When the phone is locked in the on condition, the power source will soon be exhausted and the phone will be useless until the power source is replaced. However, as soon as the housing is opened to replace the power source, the phone automatically moves into an off condition and cannot be re-activated without connecting the key to the lock. The phone thus is either locked on or locked off whenever the key is not connected to the lock. Thus, the phone default condition is "locked."

The mobile phone is used by connecting the key to the lock, moving the on/off switch into the on position and then disconnecting the key from the lock. This locks the mobile phone in the on, or operating, condition. The key is disconnected from the lock and removed from the vicinity of the phone. If the phone is lost or stolen, the phone cannot be turned off and the power source will soon be exhausted. This significantly limits the amount of calling time that can be used or stolen by someone who is not authorized to use the phone. As soon as the power source is exhausted, the unauthorized user may try to replace the power source. Removal of the power source from the housing will automatically turn the phone off and the phone will be automatically locked in the off condition. This prevents further unauthorized use of the phone.

After the phone is turned on by the authorized user and the key disconnected from the lock, the phone can be de-activated by the authorized user by re-connecting the key to the lock and moving the on/off-switch to the off condition. The key is then disconnected from the lock and removed from the vicinity of the phone. The phone will thus be locked in the de-activated condition. If such a de-activated phone is lost or stolen, it cannot be used.

The lock is easy to use and the phone is always locked so unauthorized use is severely limited or even prevented. The lock is simple and inexpensive to install in either new or existing mobile phones.

BRIEF DESCRIPTION OF THE DRAWING FIGURES

DETAILED DESCRIPTION OF THE PREFERRED EMBODIMENT

Figure 1:
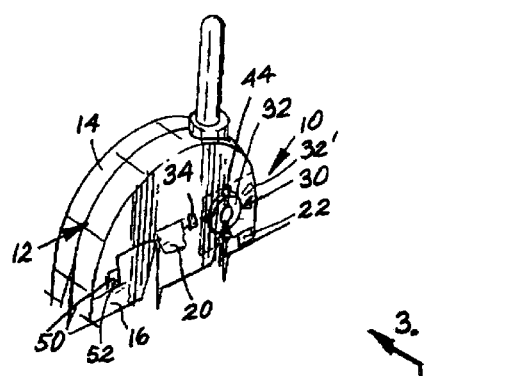
FIG. 1 is a partial perspective view of a cellular telephone which incorporates the lock embodying the present invention.
Figure 2:
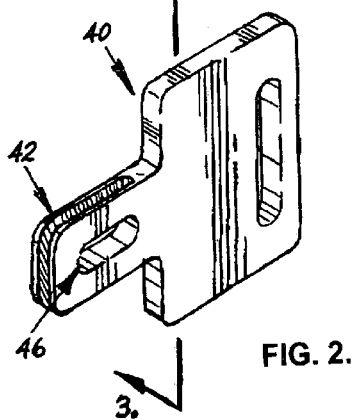
FIG. 2 is a perspective view of a key used in the lock embodying the present invention.
Figure 3:
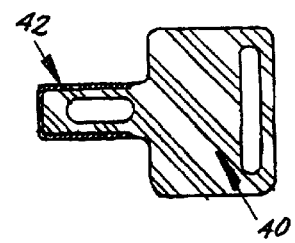
FIG. 3 is a view of the key shown in FIG. 2 taken along line 3—3 of FIG. 2.
Figure 4:
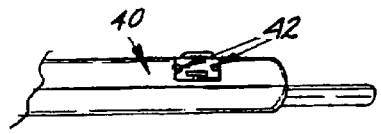
FIG. 4 is a view of a lock as shown in FIG. 1.

Other objects, features and advantages of the invention will become apparent from a consideration of the following detailed description and the accompanying drawings.

Referring to the Figures, it can be understood that the present invention is embodied in a combination 10. Combination 10 includes a mobile phone 12 which includes a housing 14, a power source 16 such as a battery or the like and which is located in the housing 14, and operational circuitry 20 which is also located in the housing 14. Operational circuitry 20 is common to mobile phones. Since the details of the operational circuitry 20 are not important to the invention, these details will not be presented in detail. An on/off switch 22 is located on the housing 14 and is electrically connected to the operational circuitry 20 and to the power source 16 to activate the operational circuitry 20 when the on/off switch 22 is in an on condition and to de-activate the operational circuitry 20 when the on/off switch 22 is in an off condition. The on/off switch 22 can be a button on the keypad or a special switch, as suitable for a mobile phone 12. Again, the specific details of the on/off switch 22 will not be presented in detail as those skilled in the art will understand such details based on the teaching of the present disclosure.

A locking system 30 is on the mobile phone 12 to prevent, or at least limit, unauthorized use of the mobile phone 12. Locking system 30 includes a lock 32 connected to the on/off switch 22. The lock 32 moves between a locked condition, shown in solid lines in FIG. 1, and an unlocked condition; indicated by dotted lines at 32' in FIG. 1. The lock 32 includes elements 34 which prevent the on/off switch 22 from changing between the on condition and the off condition or between the off condition and the on condition when the lock 32 is in the locked condition and which permit the on/off switch 22 to change between the on condition and the off condition or between the off condition and the on condition when the lock 32 is in the unlocked condition.

A key 40 is associated with the lock 32. The key 40 includes elements 42, such as an electrical strip, and the lock 32 includes elements, such as a corresponding electrical circuit 44, that is completed by the elements 42, which prevent the lock 32 from changing from the locked condition to the unlocked condition when the key 40 is not connected to the lock 32 and which permit the lock 32 to change from the locked condition to the unlocked condition when the key 40 is connected to the lock 32. The electrical circuit 44 must be complete for the lock 32 to be unlocked and the lock 32 cannot be unlocked when electrical circuit 44 is not completed. Those skilled in the art of electrical locks will understand the details of such locks and thus such details will not be presented here in detail. The elements 42 can be located on one portion 46 of the key.

A power source connecting switch 50 connects the power source 16 to the housing 14. The power source connecting switch 50 is also connected to the on/off switch 22. The power source connecting switch 50 includes elements 52 that are connected to the on/off switch 22 and automatically move the on/off switch 22 into the off condition whenever the power source 16 is removed from the housing 14. Since the on/off switch 22 is movable from the off condition to the on condition only when the lock 32 is in the unlocked condition, after the on/off switch 22 is automatically moved is into the off condition by removal of the power source 16 from the housing 14, the key 40 must be connected to the lock 32 and the lock 32 moved into the unlocked condition to permit the on/off switch 22 to be moved back into the on condition. This automatically locks the mobile phone 12 into the de-activated condition as soon as the power source 16 is removed from the housing 14. As before, since the exact details of the power source connecting switch 50 are not important to the invention, just the fact that such a switch is present is important, these details will not be presented in detail.

A method of protecting a mobile phone against unauthorized use embodying the present invention comprises: providing an on/off switch 22 on a mobile phone 12 and activating the mobile phone 12 when the on/off switch 22 is in an on condition and deactivating the mobile phone 12 when the on/off switch 22 is in an off condition; providing operational circuitry 20 in the mobile phone 12; providing a power source 16 in the mobile phone 12; electrically connecting the power source 16 to the operational circuitry 20 when the on/off switch 22 is in the on condition and disconnecting the operational circuitry 20 from the power source 16 when the on/off switch 22 is in the off condition; automatically moving the on/off switch 22 into the off condition whenever the power source 16 is removed from the mobile phone 12; providing a lock 32 and connecting the lock 32 to the on/off switch 22, the lock 32 being changeable between a locked condition and an unlocked condition; disabling the on/off switch 22 and preventing the on/off switch 32 from moving either into the on condition from the off condition or into the off condition from the on condition when the lock 32 is in the locked condition whereby if the on/off switch 22 is in the off condition and the lock 32 is in the locked condition, the on/off switch 22 cannot be changed into the on condition until the lock 32 is changed to the unlocked condition from the locked condition and if the on/off switch 22 is in the on condition and the lock 32 is in the locked condition, the on/off switch 22 cannot be moved into the off condition until the lock 32 is changed to the unlocked condition from the locked condition; enabling the on/off switch 22 and permitting the on/off switch 22 to move into either or both the on condition and/or the off condition when the lock 32 is in the unlocked condition; providing a key 40 and permitting the lock 32 to change from the locked condition to the unlocked condition when the key 40 is connected to the lock 32; requiring the key 40 to be connected to the lock 32 to change the lock 32 from the locked condition to the unlocked condition and from the unlocked condition to the locked condition whereby if the on/off switch 22 is in the on condition and the lock 32 is in the locked condition and the key 40 is not connected to the lock 32, the on/off switch 22 cannot be moved into the off condition until the key 40 is connected to the lock 32 and the lock 32 moved to the unlocked condition and if the on/off switch 22 is in the off condition and the lock 32 is in the locked condition and the key 40 is not connected to the lock 32, the on/off switch 22 cannot be moved to the on condition until the key 40 is connected to the lock 32 and the lock 32 moved to the unlocked condition.

Operation of the mobile phone 12 and lock 32 are effected by: connecting the key 40 with the lock 32 and placing the lock 32 in the unlocked condition; after connecting the key 40 with the lock 32 and placing the lock 32 in the unlocked condition, placing the on/off switch 22 into the on condition, the mobile phone 12 being activated while the on/off switch 22 is in the on condition; changing the lock 32 into the locked condition and disconnecting the key 40 from the lock 32 while the mobile phone 12 is activated with the on/off switch 22 in the on condition; after the key 40 has been disconnected from the lock 32, re-connecting the key 40 to the lock 32 while the mobile phone 12 is activated; after the key 40 is re-connected to the lock 32 with the mobile phone 12 activated, changing the lock 32 to the unlocked condition and changing the on/off switch 22 to the off condition, the mobile phone 12 being de-activated when the on/off switch 22 is in the off condition; and after placing the on/off switch 22 in the off condition, moving the lock 32 into the locked condition and disconnecting the key 40 from the lock 32.

It is understood that while certain forms of the present invention have been illustrated and described herein, it is not to be limited to the specific forms or arrangements of parts described and shown.

What is claimed and desired to be covered by Letters Patent is:

1. In combination:
   a) a mobile phone which includes
      (1) a housing,
      (2) a power source in said housing,
      (3) operational circuitry in said housing; and
      (4) an on/off switch on the housing and electrically connected to said operational circuitry and to said power source to activate said operational circuitry when said on/off switch is in an on condition and to de-activate said operational circuitry when said on/off switch is in an off condition; and
   b) a locking system on said mobile phone which includes
      (1) a-lock connected to the on/off switch, the lock moving between a locked condition and an unlocked condition, the lock including elements which prevent the on/off switch from changing between the on condition and the off condition or between the off condition and the on condition when the lock is in the locked condition and which permit the on/off switch to change between the on condition and the off condition or between the off condition and the on condition when the lock is in the unlocked condition,
      (2) a key which is associated with the lock,
      (3) elements in the key and in the lock which prevent the lock from changing from the locked condition to the unlocked condition when the key is not connected to the lock and which permit the lock to change from the locked condition to the unlocked condition when the key is connected to the lock,
      (4) a power source connecting switch connecting the power source to the housing, the power source connecting switch also being connected to the on/off switch, the power source connecting switch including elements that automatically move the on/off switch into the off condition whenever the power source is removed from the housing, the on/off switch being movable from the off condition to the on condition only when the lock is in the unlocked condition whereby after the on/off switch is automatically moved into the off condition by removal of the power source from the housing, the key must be connected to the lock and the lock moved into the unlocked condition to permit the on/off switch to be moved back into the on condition.

2. A method of protecting a mobile phone against unauthorized use comprising:
   a) providing an on/off switch on a mobile phone and activating the mobile phone when the on/off switch is in an on condition and deactivating the mobile phone when the on/off switch is in an off condition;
   b) providing operational circuitry in the mobile phone;
   c) providing a power source in the mobile phone;
   d) electrically connecting the power source to the operational circuitry when the on/off switch is in the on condition and disconnecting the operational circuitry from the power source when the on/off switch is in the off condition;
   e) automatically moving the on/off switch into the off condition whenever the power source is removed from the mobile phone;
   f) providing a lock and connecting the lock to the on/off switch, the lock being changeable between a locked condition and an unlocked condition;
   g) disabling the on/off switch and preventing the on/off switch from moving either into the on condition from the off condition or into the off condition from the on condition when the lock is in the locked condition whereby if the on/off switch is in the off condition and the lock is in the locked condition the on/off switch cannot be changed into the on condition until the lock is changed to the unlocked condition from the locked condition and if the on/off switch is in the on condition and the lock is in the locked condition the on/off switch cannot be moved into the off condition until the lock is changed to the unlocked condition from the locked condition;
   h) enabling the on/off switch and permitting the on/off switch to move into either or both the on condition and/or the off condition when the lock is in the unlocked condition;
   i) providing a key and permitting the lock to change from the locked condition to the unlocked condition when the key is connected to the lock;
   j) requiring the key to be connected to the lock to change the lock from the locked condition to the unlocked condition and from the unlocked condition to the locked condition whereby if the on/off switch is in the on condition and the lock is in the locked condition and the key is not connected to the lock the on/off switch cannot be moved into the off condition until the key is connected to the lock and the lock moved to the unlocked condition and if the on/off switch is in the off condition and the lock is in the locked condition and the key is not connected to the lock the on/off switch cannot be moved to the on condition until the key is connected to the lock and the lock moved to the unlocked condition;
   k) connecting the key with the lock and placing the lock in the unlocked condition;
   l) after connecting the key with the lock and placing the lock in the unlocked condition, placing the on/off switch into the on condition, the mobile phone being activated while the on/off switch is in the on condition;

m) changing the lock into the locked condition and disconnecting the key from the lock while the mobile phone is activated with the on/off switch in the on condition;
n) after the key has been disconnected from the lock, re-connecting the key to the lock while the mobile phone is activated;
o) after the key is re-connected to the lock with the mobile phone activated, changing the lock to the unlocked condition and changing the on/off switch to the off condition, the mobile phone being de-activated when the on/off switch is in the off condition; and
p) after placing the on/off switch in the off condition, moving the lock into the locked condition and disconnecting the key from the lock.

* * * * *